United States Patent
Krishnan et al.

(10) Patent No.: US 9,083,705 B2
(45) Date of Patent: Jul. 14, 2015

(54) IDENTIFYING NATED DEVICES FOR DEVICE-SPECIFIC TRAFFIC FLOW STEERING

(71) Applicants: Suresh Krishnan, Montreal (CA); Meral Shirazipour, Brossard (CA); Catherine Truchan, Lorraine (CA)

(72) Inventors: Suresh Krishnan, Montreal (CA); Meral Shirazipour, Brossard (CA); Catherine Truchan, Lorraine (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 182 days.

(21) Appl. No.: 13/849,362

(22) Filed: Mar. 22, 2013

(65) Prior Publication Data
US 2014/0140344 A1 May 22, 2014

Related U.S. Application Data

(60) Provisional application No. 61/729,395, filed on Nov. 22, 2012, provisional application No. 61/791,291, filed on Mar. 15, 2013.

(51) Int. Cl.
*H04L 12/28* (2006.01)
*H04L 29/06* (2006.01)
*H04L 29/12* (2006.01)
*H04L 12/24* (2006.01)
*H04L 12/721* (2013.01)

(52) U.S. Cl.
CPC ........ *H04L 63/0892* (2013.01); *H04L 41/0813* (2013.01); *H04L 61/2517* (2013.01); *H04L 45/38* (2013.01)

(58) Field of Classification Search
None
See application file for complete search history.

(56) References Cited

U.S. PATENT DOCUMENTS

| 8,102,840 B2 * | 1/2012 | Kittredge et al. ............. 370/352 |
| 2009/0073987 A1 * | 3/2009 | Li et al. .................... 370/395.31 |
| 2011/0211583 A1 | 9/2011 | Seetharaman et al. |
| 2011/0317559 A1 | 12/2011 | Kern et al. |
| 2012/0136976 A1 | 5/2012 | Krishnan et al. |

OTHER PUBLICATIONS

P. Srisuresh et al., "IP Network Address Translator (NAT) Terminology and Considerations", RFC 2663, Aug. 1999, pp. 1-30.
Open Networking Foundation, Software Defined Networking: The New Norm for Networks, ONF White Paper, Apr. 13, 2012, pp. 01-12.
M. Boucadair et al, IPv4 Connectivity Access in the Context of IPv4 Address Exhaustion, Network Working Group, IETF, Jan. 30, 2009, pp. 01-41.
PCT International Search Report from corresponding application PCT/IB2013/060317.

* cited by examiner

*Primary Examiner* — Duc C Ho (57) ABSTRACT

The present disclosure describes methods and apparatus for differentiating subscriber devices of a subscriber hidden by a network address translation device and enables traffic flow steering on a per device basis rather than a per subscriber basis. Identification of subscriber devices is achieved by assigning a reserved set of external ports to each subscriber device. Different service paths can be defined for different subscriber devices to provide a subscriber with a different experience for each subscriber device of the subscriber.

31 Claims, 8 Drawing Sheets

IDENTIFYING NATED DEVICES FOR DEVICE-SPECIFIC TRAFFIC FLOW STEERING

This application claims priority to U.S. Provisional Patent Application No. 61/791,291, filed Mar. 15, 2013 and U.S. Provisional Patent Application No. 61/729,395, filed Nov. 22, 2012, the contents of which are hereby incorporated herein by reference.

TECHNICAL FIELD

The present disclosure relates generally to traffic flow steering in software defined networks (SDNs) and, more particularly, to identification of devices hidden by a network address translation (NAT) device to enable device-specific traffic flow steering.

BACKGROUND

An Internet Protocol version 4 (IPv4) address is composed of 32 bits, which yields an address space of 4294967296 (232) addresses. With the constant increase in popularity of Internet connected devices, available IPv4 addresses are becoming scarce. The problem of IPv4 address exhaustion has stimulated the development of the Internet Protocol version 6 (IPv6) protocol, which provides a 128-bit address space. However, there is little pressure to change deployed and properly working systems from IPv4 to IPv6 in the short-term to mid-term, especially for service providers that benefit from a relatively large pool of already assigned public IPv4 addresses. Solutions such as network address translation (NAT) together with private IPv4 addresses are seen as sufficient by many service providers.

NAT technology is described in RFC2663, by P. Srisuresh, M. Holdrege, "IP Network Address Translator (NAT) Terminology and Considerations", RFC2663, August 1999. NAT hides private IP addresses used by devices in private networks behind a single "public" IP address. Private IPv4 addresses are not routable outside of the private network. A NAT device connecting the private network to the public network translates the private addresses used in the private network to public IP addresses. Packets originating from or destined for devices within the private network must pass through the NAT device. The NAT device maintains a NAT table for mapping private IP address/ports valid in the private network to valid public IP address/ports. The NAT device modifies the IP header of each traversing packet based on the NAT table.

Most fixed broadband service providers currently provide a single public IPv4 address for use in home networks. The home network typically includes a Residential Gateway (RG) acting as a NAT device. Using NAT, a public IPv4 address assigned to the RG can be shared by multiple subscriber devices in the home network. The subscriber devices are each assigned a local IPv4 address by the RG, which are not valid outside of the home network. When a packet passes through the RG, the NAT function in the RG replaces the private address of the subscriber device with the public address assigned to the RG. Therefore, all traffic flows from the RG carry the same public IP address, and devices in the public network have no means of identifying which subscriber device the traffic originates from.

Software-Defined Networking (SDN) provides a new network architecture that separates the control plane and traffic plane. With SDN, it is possible to define different service paths for different traffic flows, thus allowing service providers to offer customized services to subscribers depending on the type of traffic. However, the use of NAT presents a challenge for emerging SDN-based steering networks. When the subscriber's home network includes an RG acting as a NAT device, the SDN may apply subscriber-specific traffic flow steering by defining a customized service path for all traffic to and from the IP address assigned to the RG in the subscriber's home network. However, the SDN-based steering network has no way of differentiating subscriber devices behind the RG and therefore cannot provide device-specific traffic flow steering for subscriber devices hidden behind a NAT device.

SUMMARY

The present disclosure describes techniques for differentiating subscriber devices of a subscriber hidden by a network address translation device and enables traffic flow steering on a per device basis rather than a per subscriber basis. Identification of subscriber devices is achieved by assigning a reserved set of external ports associated with the public IP address of the network address translation device to each subscriber device. Using these techniques, different service paths can be defined for different subscriber devices to provide a subscriber with a different experience for each subscriber device of the subscriber.

Exemplary embodiments of the invention comprise methods implemented by a network address translation device in a private communication network of enabling device-specific traffic flow steering, in an external network, of traffic associated with a subscriber device in the private communication network. The subscriber device is assigned a private IP address. In one exemplary method, the network address translation reserves, for a first subscriber device associated with a first device identity, a set of external ports associated with a public IP address of the network address translation device. The network address translation device receives, from the external network, a list of device identities for one or more subscriber devices. Each subscriber device in the list of devices has a defined device-specific service path. The network address translation device determines if the first device identity associated with the first subscriber device is included in the received list of device identities. If the first device identity associated with the first subscriber device is included in the list of device identities, the network address translation device sends the reserved set of external ports for the first subscriber device and associated IP address to the external network to enable traffic traversing the reserved set of ports to be steered according to a device-specific service path defined for the first subscriber device.

Other exemplary embodiments of the invention comprise methods implemented by a network node in an external communication network of enabling device-specific traffic flow steering, in the external network, of traffic associated with a subscriber device in a private network. In one embodiment of the method, the network node identifies subscriber devices of a subscriber for which a device-specific service path has been defined. The network node sends, to a network address translation device in the private network, an expression of interest message including a list of devices identities for one or more of the subscriber devices in which the network node is interested. The network node receives, from the network address translation device, a set of reserved ports associated with a public IP address of the network address translation device for at least one subscriber device identified in the expression of interest message.

Other exemplary embodiments of the invention comprise methods implemented by a network controller in a steering network of steering traffic flows associated with a subscriber device in a private network. In some embodiments of the method, the network controller receives a reserved set of ports for a first subscriber device. The reserved set of ports is associated with a public address of a network address translation device. The network controller also receives a device-specific service path for the first subscriber device and configures the steering network to steer traffic associated with the first subscriber device according to the device-specific service path.

Other exemplary embodiments of the invention comprise a network address translation device in a private communication network for enabling device-specific traffic flow steering, in an external network, of traffic associated with a subscriber device in the private communication network. The subscriber device is assigned a private IP address. In some embodiments, the network address translation device comprises a first interface circuit for communicating with subscriber devices in the private network, a second communication interface for communicating with an external network, and a processing circuit connected between the first and second communication interfaces. The processing circuit is configured to reserve, for a first subscriber device associated with a first device identity, a set of external ports associated with a public IP address of the network address translation device. The processing circuit is further configured to receive, from the external network, a list of devices identities for one or more subscriber devices, each subscriber device in said list of devices having a defined device-specific service path. The processing circuit is further configured to determine if the first device identity associated with the first subscriber device is included in the received list of device identities and to send the reserved set of external ports for the first subscriber device and associated IP address to the external network if the first device identity associated with the first subscriber device is included in the list of device identities to enable traffic traversing the reserved set of ports to be steered according to a device-specific service path defined for the first subscriber device.

Other exemplary embodiments of the invention comprise a network node in an external network for enabling device-specific traffic flow steering, in the external network, of traffic associated with a subscriber device in a private network. The network node comprises an interface circuit for connecting to an external network and communicating with devices in the external network, and a processing circuit connected to the interface circuit. The processing circuit is configured to identify subscriber devices of a subscriber for which a device-specific service path has been defined and to send, to a network address translation device in the private network, an expression of interest message including a list of devices identities for one or more of the subscriber devices in which the network node is interested. The processing circuit is further configured to receive, from the network address translation device, a set of reserved ports associated with a public IP address of the network address translation device for at least one subscriber device identified in said expression of interest message.

Other exemplary embodiments of the invention comprise a network controller in a steering network of steering traffic associated with a subscriber device in a private network. In one embodiment, the network controller comprises an interface circuit for connecting to an external network and communicating with network nodes in the external network, and a processing circuit connected to the interface circuit. The processing circuit is configured to receive a reserved set of ports for a first subscriber device. The processing circuit is further configured to receive a device-specific service path for a first subscriber device and to configure the device-specific service path in a steering network to steer traffic associated with the first subscriber device according to the device-specific service path.

The embodiments of the present disclosure allow a network operator to increase the average revenue per user (ARPU) by offering differentiated services on a per device basis, rather than on a per subscription basis. The embodiments of the present disclosure also allow for future enhancements of fixed mobile convergence (FMC) scenarios and various new ways to handle fixed and mobile subscribers of the operator.

DETAILED DESCRIPTION

Figure 1:
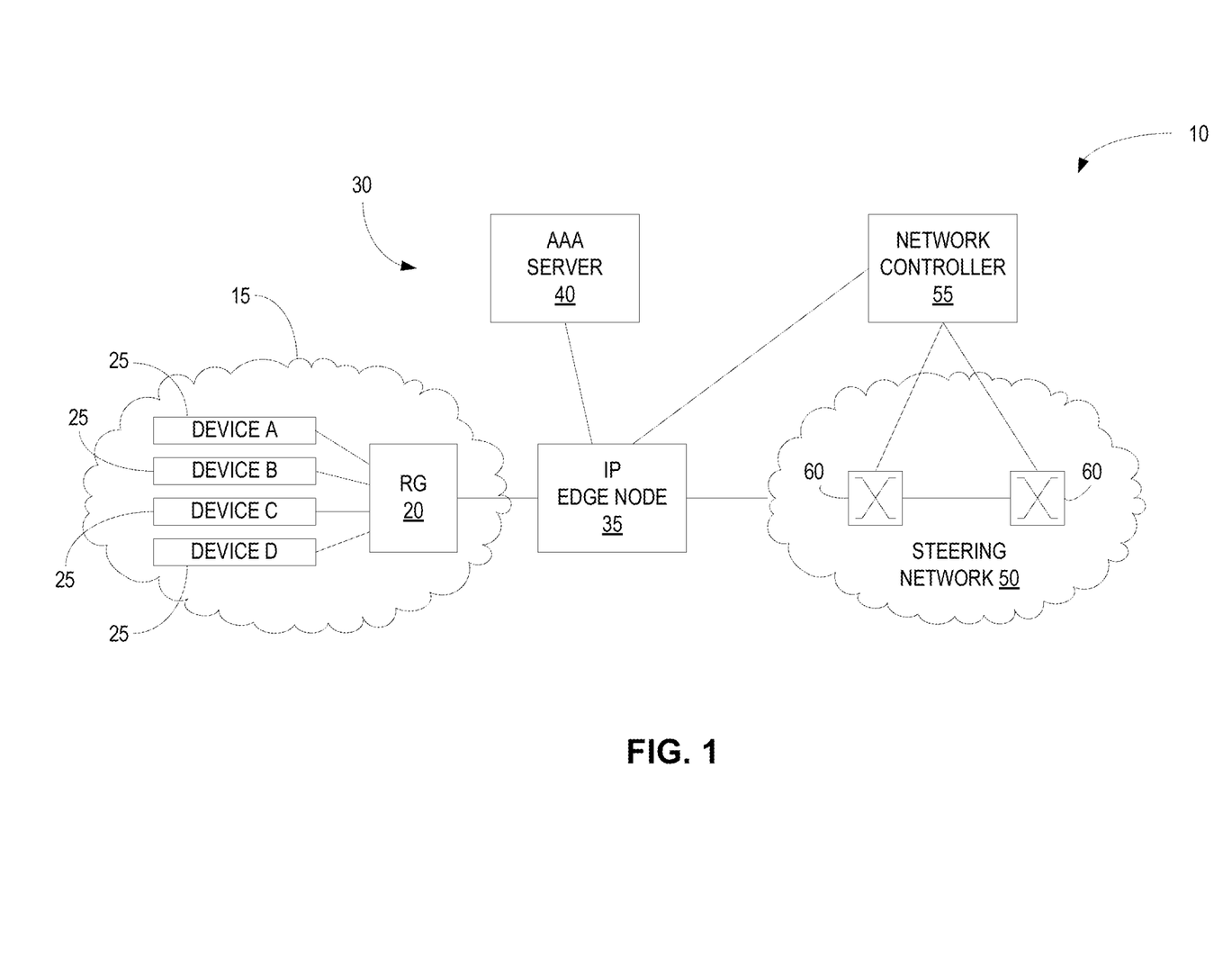
FIG. 1 illustrates a communication network in which the present disclosure may be implemented.

Referring now to the drawings, FIG. 1 illustrates an exemplary communication network 10 according to one embodiment of the present disclosure. The communication network 10 comprises a residential gateway (RG) 20 providing connection to an external network 30 for a plurality of subscriber devices 25 in a private network 15, such as a home network of a subscriber. In FIG. 1, four subscriber devices (denoted as Devices A-D) are shown. The external network 30 may comprise, for example, service provider network or public wide area network (WAN), e.g., the Internet. The subscriber devices 25 may comprise personal computers, tablets, smart phones, or other user equipment (UE). The subscriber devices 25 may communicate with the RG 20 over a local area network (LAN), wireless LAN (WLAN), or short range radio interface, e.g. WiFi, BLUETOOTH®., etc.

In the exemplary embodiment, the Internet Protocol (IP) is used for routing packets in both the private network 15 and external network 30. The RG 20 is configured as a layer-3 gateway. The RG 20 is assigned a public IP version 4 (Ipv4) address from a pool of IP addresses belonging to the network operator. This address is the subscriber's "public" address in the external network 30. The RG 20 assigns private IP addresses to the subscriber devices 25 in the private network 15 and functions as a NAT device by performing network address translation (NAT) on packets traversing the RG 20. The private addresses assigned by the RG 20 to the subscriber devices 25 are not routable outside of the private network 15.

The external network 30 includes an IP edge node 35 (or border edge node or border node) and Authentication, Authorization, and Accounting (AAA) server 40 of other Authentication Function (AF). The IP edge node 35 is responsible for QoS, filtering, policy enforcement, and the like for traffic from the subscriber devices 25 connected through the RG 20. The AAA server 40 is responsible for authenticating subscriber devices, authorizing services, and accounting.

The communication network 10 further includes a steering network 50 and network controller 55 implementing a Software Defined Networking (SDN) protocol, such as the OPENFLOW protocol. The steering network 50 and network controller 55 may be part of the external network 30, or may comprise a separate network. The steering network 50 includes a plurality of switches 60 for forwarding data traffic. The network controller 55 manages the switches 60 in the steering network 50 and provides an application interface for higher layer applications.

The steering network 50 leverages on SDN principles and allows steering of traffic flows between various network services and value-added services (such as content filtering, network-based firewall, virus scanning, etc.) based on different steering policies. A list of network services and/or value-added services, referred to as a service set, is associated with each subscriber and is stored as part of the subscriber's profile by the AAA server 40. The services may be selected by the subscriber and/or defined by the network operator based on, for instance, the application type associated with a particular traffic flow (e.g. video, Skype, social networks, etc.). The services within a service set can be implemented by a series of middleboxes. Based on the service set, a service path is defined for each subscriber specifying the order of services to be applied to a given traffic flow. Different service paths may be defined for different types of traffic flows. Also, different service paths may be configured for upstream and downstream directions. The network controller 55 configures the switches 60 in the steering network 50 to steer data traffic for the subscriber according to the defined service path.

The presence of an RG 20 acting as a NAT device presents a problem from the standpoint of the steering network 50. For subscriber identification, the network controller 55 for the steering network 50 typically uses the subscriber's ID and IP address. Because the RG 20 hides the subscriber devices 25 in the private network 15 behind a single public IP address, the network controller 55 has no way of differentiating the subscriber devices 25 within the private network 15. In this scenario, traffic flow steering is typically applied on a per subscriber basis so that the subscriber receives the same user experience on all subscriber devices 25 in the private network 15.

The present disclosure describes techniques for differentiating subscriber devices 25 of a subscriber hidden by the RG 20 or other NAT device, and for enabling traffic flow steering on a per device basis rather than a per subscriber basis. Using these techniques, different service paths can be defined for different subscriber devices 25 belonging to the same subscriber to give the subscriber a different user experience for each subscriber device 25.

In order to identify the subscriber devices 25 connected behind the RG 20, the RG 20 reserves a range of external ports on its assigned public IP address for each subscriber device 25. For example, when a subscriber device 25 connects with the RG 20, the RG 20 allocates a private or local IPv4 address to the connecting subscriber device 25 and reserves a group or range of external ports on its public IPv4 address for the subscriber device 25. The RG 20 can then communicate the reserved group of external ports for the subscriber device 25 to the IP edge node 35 or other network node in the external network 30, such as the network controller 55, for potential later use. When the subscriber device 25 sends traffic to the external network 30 (the steering network 50, for example), the traffic is forwarded by the RG 20 through one of the reserved external ports. The IP edge node 35 or other network node on the public side of the RG 20 can identify the subscriber device 25 based on the external port used for the traffic. Therefore, proper identification of the subscriber device 25 can be achieved at the IP edge node 35, network controller 55, and other nodes in the external network 30, even though the subscriber device 25 resides behind a NAT device in a private network 15.

Figure 2:
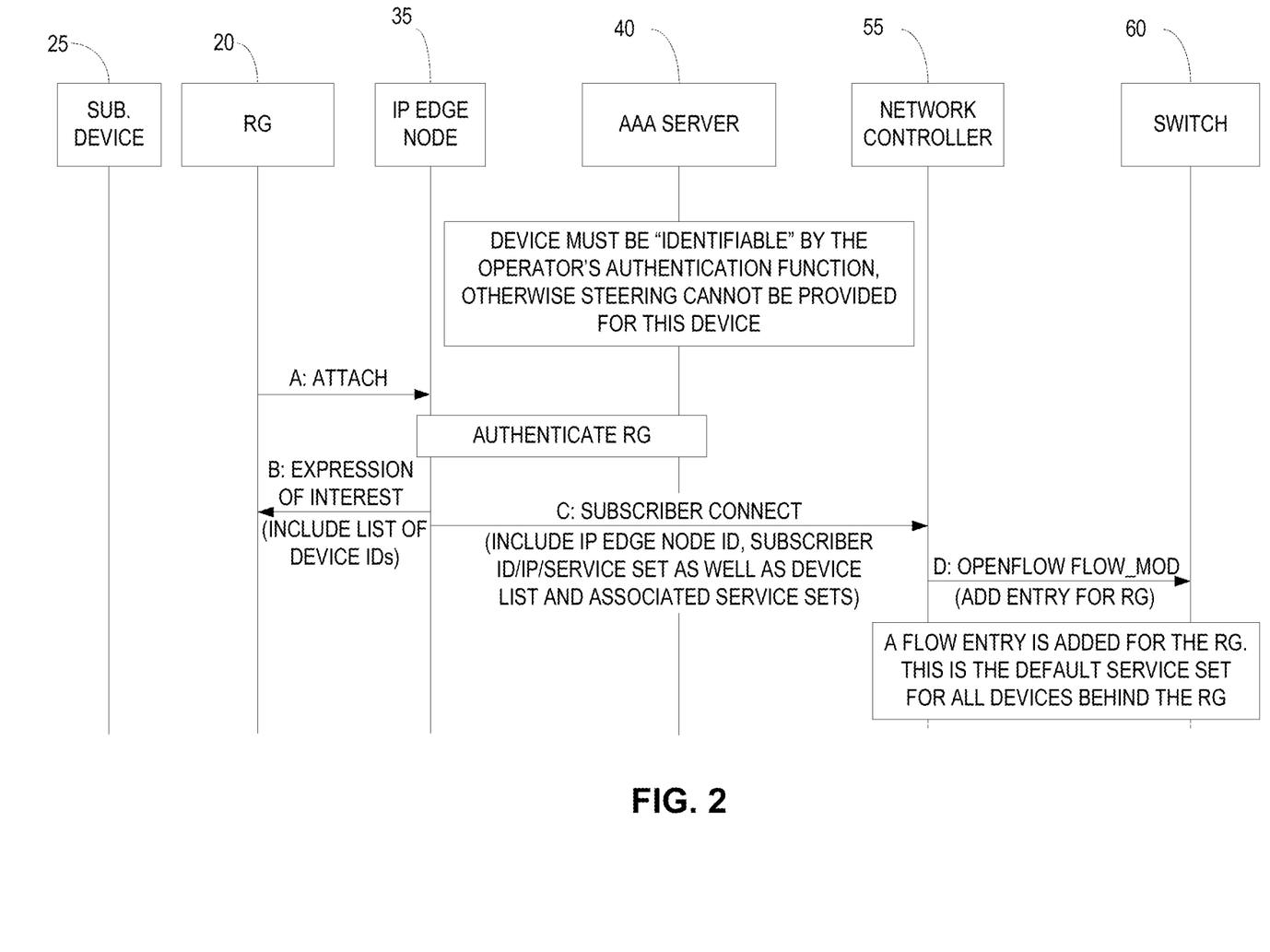
FIG. 2 illustrates signaling for configuring a device-specific service path for a subscriber device hidden by a NAT device.

FIG. 2 is a flow diagram illustrating an exemplary method of expressing interest in subscriber devices 25 for traffic flow steering according to one embodiment of the present disclosure. It is assumed that the subscriber devices 25 connected to the RG 20 are registered in the external network 30 and are identifiable by the AAA server 40 or other Authentication Function (AF). The subscriber devices 25 can be identified by their International Mobile Subscriber Identity (IMSI), or other device identity (ID). The AAA server 40 or AF maintains a database containing subscriber profiles for all the subscribers. The subscriber profiles include, inter alia, the subscriber ID of the subscribers, and a list of registered subscriber devices 25 belonging to each subscriber. A subscriber does not need to register all of his/her subscriber devices 25 with the external network 30. For each registered subscriber device 25, a service set and/or service path is configured by the AAA server 40 or AF. The network services and/or value-added services may be selected by the subscriber and/or defined by the network operator based on, for instance, the application type associated to a particular traffic flow (e.g. video, Skype, social networks, etc.).

In step A, the RG 20 attaches itself to the IP edge node 35. Upon detection of the attachment, the IP edge node 35 initiates the authentication of the RG 20 with the AAA server or AF. During the authentication procedure, the IP edge node 35 is provided a list of subscriber devices 25. Each subscriber device 25 has a unique (for that subscriber) device ID, e.g., IMSI. The IP edge node 35 may also receive from the AAA server 40 or other AF, a defined service path for one or more of the subscriber devices 25, e.g. Devices A-C in FIG. 1 and stores the service path along with the device ID in memory.

In step B, upon successful authentication of the RG 20, the IP edge node 35 sends an expression of interest (EOI) message to the RG 20 to request a group or range of external ports assigned to the subscriber devices 25 that have been registered in the AAA server 40, i.e., for the subscriber devices 25 that were listed/configured in the subscriber's profile. For example, the EOI message may include a list of the device identities (IDs) which are registered in the AAA server or AF. The list of devices is stored by the RG 20 in memory. The list of devices may include all or part of the registered subscriber devices 25.

In step C, the IP edge node 35 sends a Subscriber Connect (SC) message to the network controller 55 to configure the switches 60 of the steering network 50 according to the defined service paths. This SC message includes the IP edge node ID, the subscriber ID, the subscriber's IP address, a default service set and/or service path, and a list of subscriber devices 25 registered in the AAA server 40 and their associated service sets and service paths. In step D, the network controller 55 sends rule(s) in an FLOW_MOD message to the switches 60 of the steering network 50 to configure the default service set and/or service path of the subscriber. The default service set and service path are applied to the subscriber devices 25 that are not registered in the AAA server 40 or AF, or for which the IP edge node 35 did not express an interest. The device-specific service paths are configured at a later point. Upon receipt of the FLOW_MOD message from the network controller 55, the switches 60 add a flow entry to or modify a flow entry in its OpenFlow rule sets. The rules in the rule set indicate how certain traffic flows should be directed.

Figure 3:
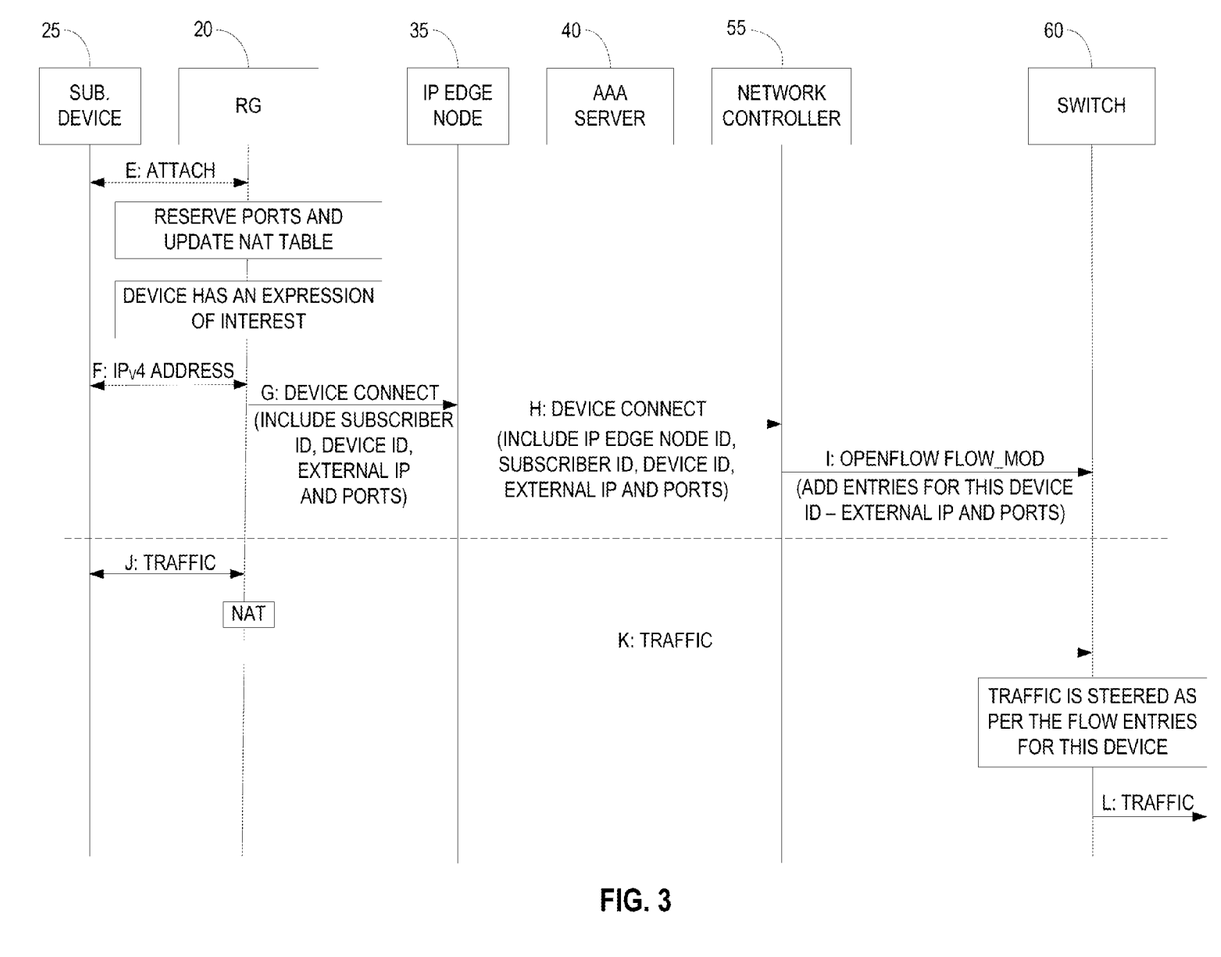
FIG. 3 illustrates signaling for steering traffic flows on a device-specific basis.

FIG. 3 illustrates a method of steering traffic on a per device basis according to an embodiment of the disclosure. In step E, a subscriber device 25 in the private network 15 attaches itself to the RG 20. Upon the subscriber device's attachment, the RG 20 reserves a set of external ports for the subscriber device 25. This set of external ports allows the subscriber device 25 to be identified in the external network 30. The RG 20 then adds the device ID and reserved set of external ports to its NAT table, which comprises a mapping between local IP addresses and ports and external IP addresses and ports. The device ID may be a MAC address, IMSI, etc. The RG 20 also determines if the IP edge node 35 has expressed interest in subscriber device 25, i.e. if its device ID is part of the list of device IDs provided by the IP edge node 35.

In step F, the RG 20 allocates a local IPv4 address to the subscriber device 25. In steps G and H, the RG 20 sends a message to the network controller 55, through the IP edge node 35, for configuring the switches 60 with the service paths for the traffic of the subscriber device 25. The message from the RG 20 to the IP edge node 35 includes the subscriber ID, the device ID, and the external IP address and ports, which belong to the reserved set of external ports associated with the subscriber device 25. The message from the IP edge node 35 to the network controller 55 comprises the IP edge node ID, the subscriber ID, the device ID and the external IP address and ports, which belong to the reserved set of external ports associated with the subscriber device 25.

Upon receipt of the message from the IP edge node 35, the network controller 55 associates the received set of external ports and device-specific service set and/or service path with the device ID. In step I, the network controller 55 sends a FLOW_MOD message to the switches 60 of the steering network 50 to configure the switches 60 to steer the traffic coming from or going to the subscriber device 25 according to the device-specific service path configured for the subscriber device 25. For example, the network controller 55 sends rule(s) to the switches 60. The rules may include, for example, the five-tuple information, i.e. source and destination IP addresses, the protocol, and the source and destination ports. Upon receipt of the FLOW_MOD message, a flow entry is added to the flow control tables by the switches 60. The flow entry indicates that all traffic to and from the subscriber device 25 will traverse the device-specific service set and service path configured for the subscriber device 25 rather than the default service set and service path that was configured for the RG 20.

In step J, traffic is sent from the subscriber device 25 to the RG 20. Using NAT at the RG 20, the traffic is forwarded in step K to the external network 30, through the IP edge node 35 to the steering network 50. Once the switches 60 receive the traffic, they apply the rules to steer the traffic according to the flow entries and the configured service path for the subscriber device 25. In step L, the traffic from the subscriber device 25 is steered as per the flow entries and the particular service set and service path configured for this device.

It should be noted that if the RG 20 determines that the IP edge node 35 has not expressed interest in the subscriber device 25 associated with a given device ID, i.e., it is not part of the list of device IDs provided by the IP edge node 35 to which the IP edge node 35 has shown interest, the traffic for the subscriber device 25 will be steered according to the default service set and service path that were determined for the subscriber (or for the RG 20).

Figure 4:
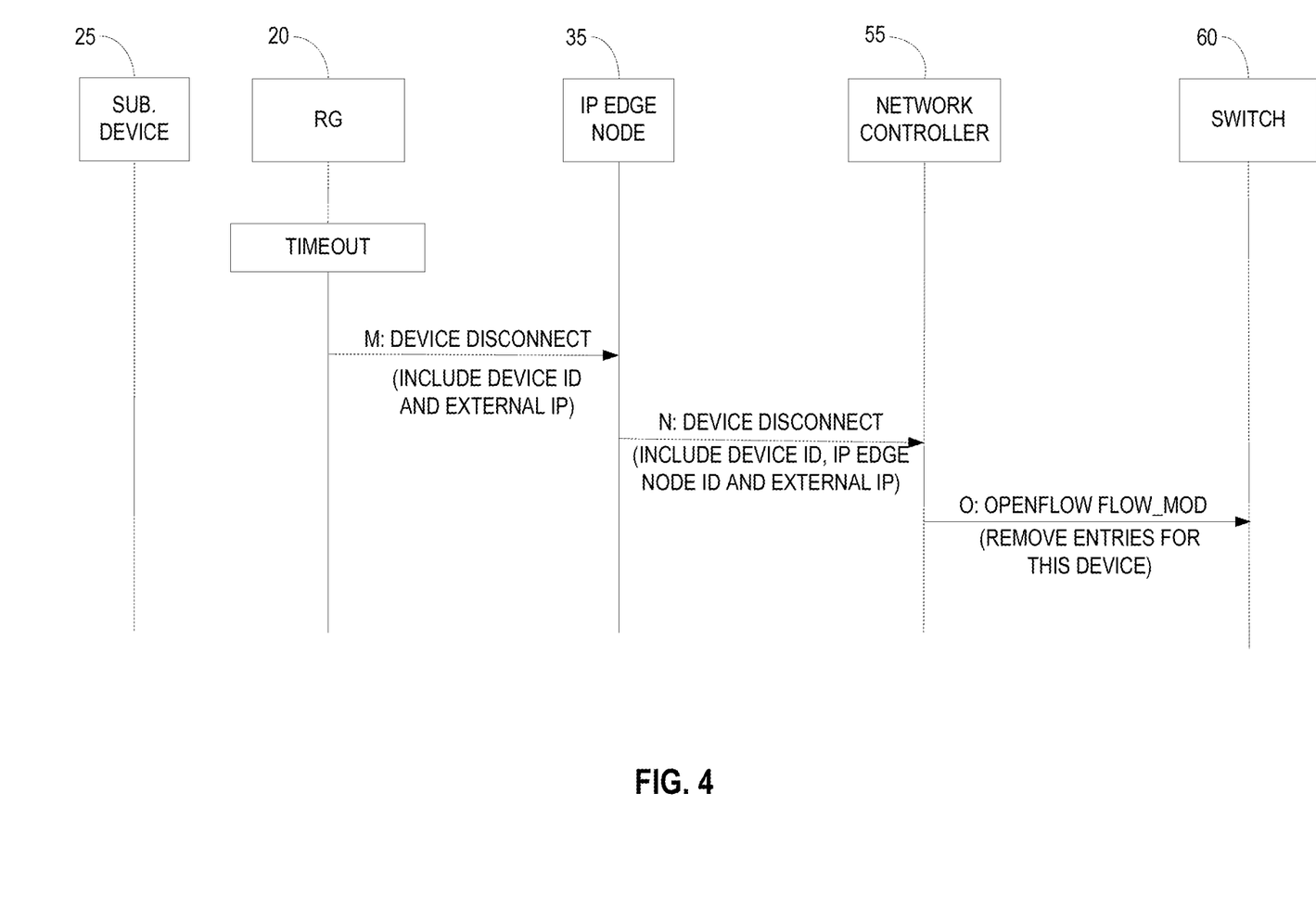
FIG. 4 illustrates signaling performed when a subscriber device disconnects from the external network.

FIG. 4 illustrates a procedure that is performed when the subscriber device 25 disconnects from the communication network 10 or when authentication times out. In steps M and N, the RG 20 sends a Device Disconnect message to the network controller 55 to remove the flow entry corresponding to the subscriber device 25. The Device Disconnect message is sent through the IP edge node 35 after an authentication timeout or device disconnection. The message from the RG 20 to the IP edge node 35 includes the device ID, and its external IP address. The message from the IP edge node 35 to the network controller 55 comprises the device ID, the IP edge node ID, and its external IP address. In step O, the network controller 55 sends a FLOW_MOD message to the switches 60 in the steering network 50 to remove the flow entries and the service set and path associated with the subscriber device 25.

When using the method of FIG. 3, some subscriber devices 25 of a subscriber will use the default service set and service path while other subscriber devices 25 will use device-specific service sets and service paths. For example, the subscriber devices 25 for which an interest has been expressed will use the service sets and service paths which have been specially configured for them. The subscriber devices 25 for which no interest has been shown will use the default service set and service path for this subscriber, i.e. a subscriber specific service path.

Figure 5:
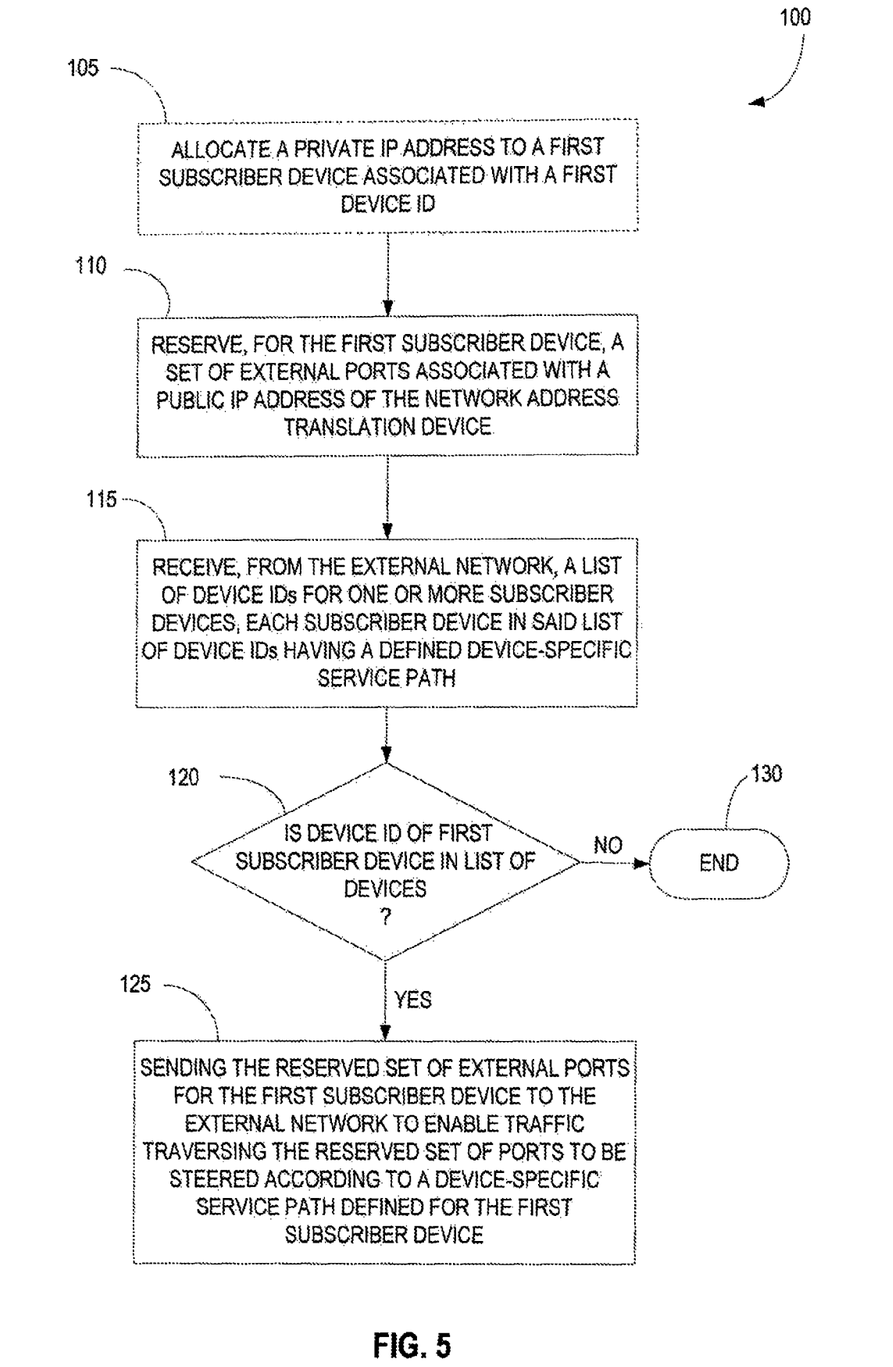
FIG. 5 illustrates a method implemented in a NAT device for enabling device-specific traffic flow steering.

FIG. 5 illustrates a method implemented by a RG 20 or other NAT device in a private communication network of enabling device-specific traffic flow steering, in an external network 30, of traffic associated with a subscriber device 25 in a private network 15. The method optionally begins with the allocation, by the RG 20 or other NAT device of a private IP address to a first subscriber device 25 associated with a first device ID (block 105). In other embodiments, the private address may be allocated by a network node other than the RG 20. The RG 20 or NAT device reserves a set of external ports for the first subscriber device 25 (block 110). The reserved set of external ports are associated with the public IP address of the RG 20 or other NAT device. The RG 20 receives, from an external network 30, a list of device IDs for one or more subscriber devices 20 (block 115). Each subscriber device 25 in the list of devices has a defined device-specific service path. In some embodiments, the list of device identities is received by the RG 20 when the RG 20 attaches to the external network 30. The RG 20 determines if the first identity associated with the first subscriber device 25 is included in the received list of device IDs (block 120). If the device ID associated with the first subscriber device 25 is included in the list of device IDs, the RG 20 sends the reserved set of external ports for the first subscriber device 25 to the external network 30 to enable traffic traversing the reserved set of external ports to be steered according to a device-specific service path designed for the first subscriber device 25 (block 125). In one exemplary embodiment, the reserve set of external ports is sent to the external network 30 in a Device Connect message when the first subscriber device 25 connects to the external network 30. If the device ID associated with the first subscriber device 25 is not included in the list of device IDs, the process ends (block 130).

Figure 6:
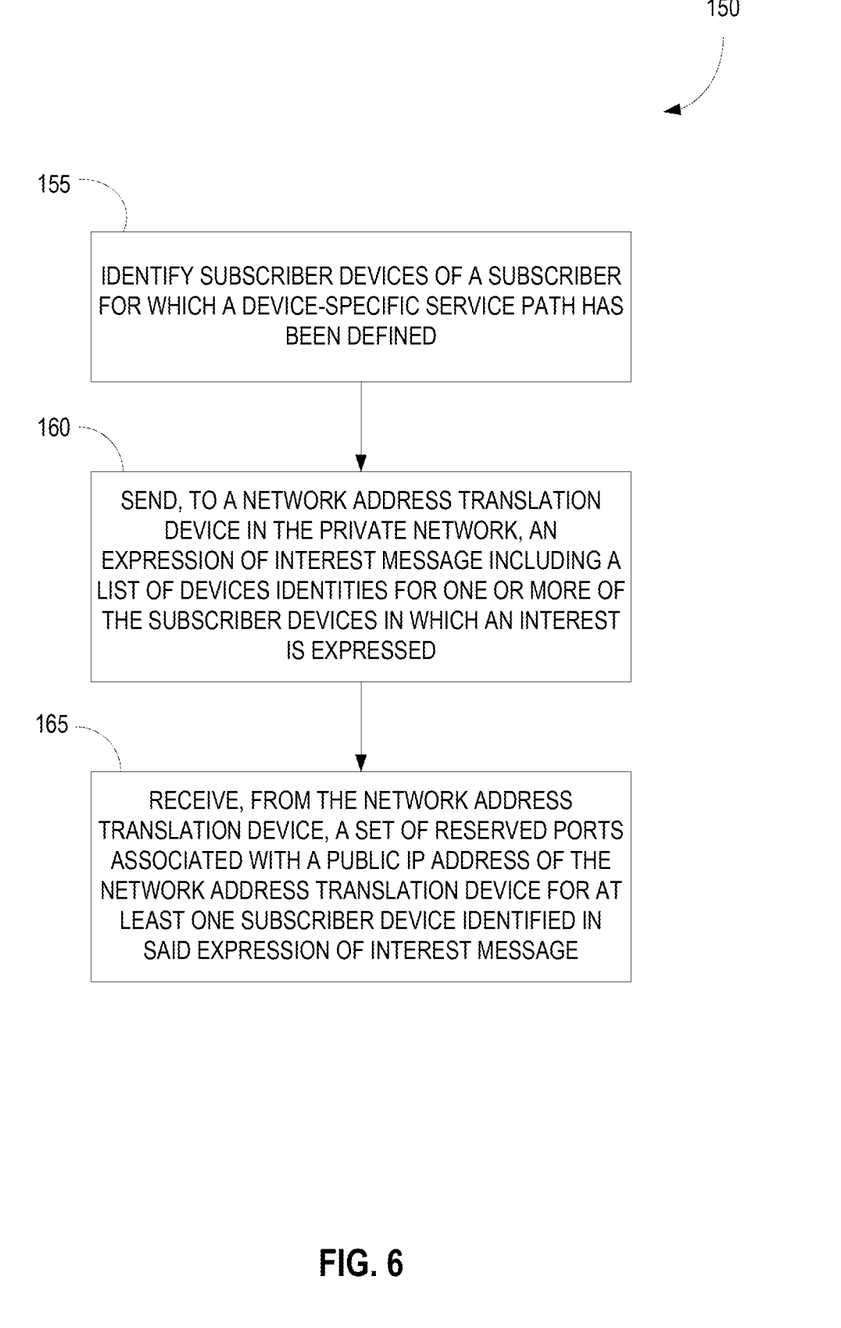
FIG. 6 illustrates a method implemented in a network node for enabling device-specific traffic flow steering.

FIG. 6 illustrates another method implemented by a network node (e.g., IP edge node 35 or network controller 55) in an external network 30 of enabling device-specific traffic flow steering, in the external network 30, of traffic associated with a subscriber device 25 in a private network 15. The method 150 begins by identifying subscriber devices of a subscriber for which a device-specific service path has been defined (block 155). The network node then sends, to a NAT device (e.g., RG 20) in the private network 15, an expression of interest message including a list of device IDs for one or more of the subscriber devices 25 in which the network node is interested (block 160). The network node thereafter receives, from the NAT device, a reserved set of external ports associated with a public IP address of the NAT device for at least one subscriber device 25 identified in the expression of interest message (block 165). In one exemplary embodiment, the NAT device stores the list of device identities in memory and sends the set of reserved ports to the network node in the external network 30 when a subscriber device in the list of device identities connects to the external network 30.

Figure 7:
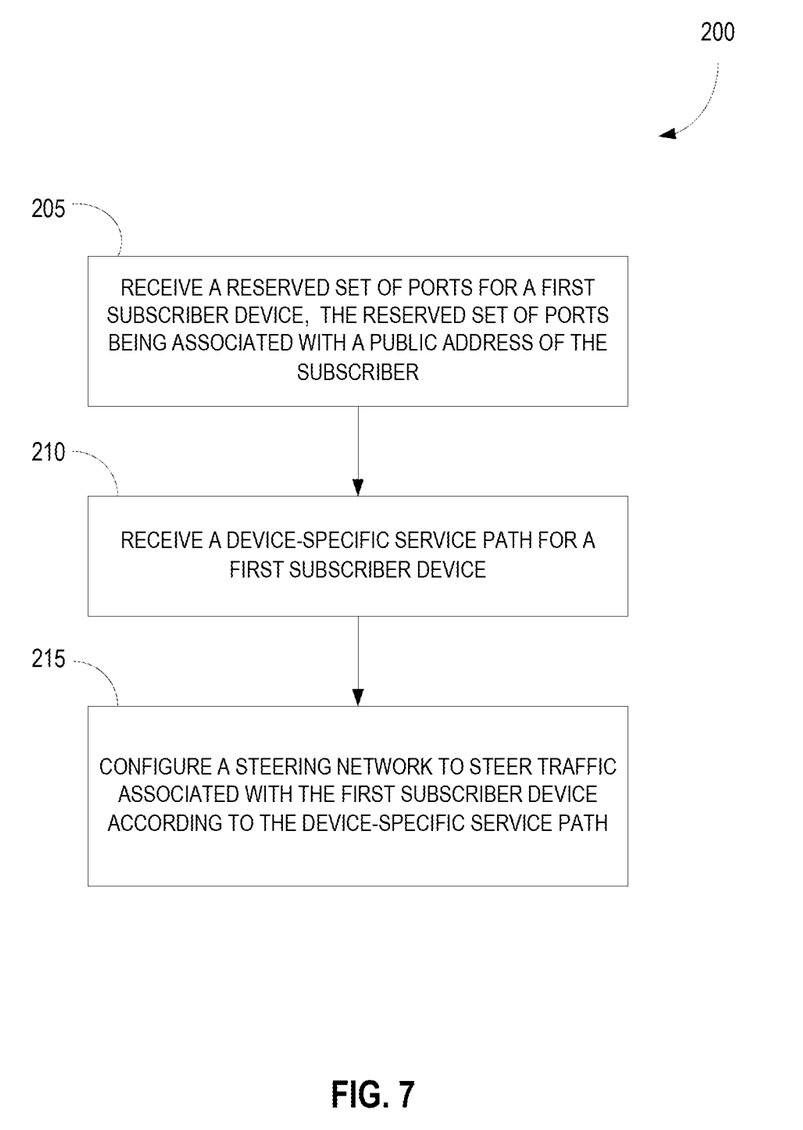
FIG. 7 a method implemented in a network controller in a steering network for enabling device-specific traffic flow steering.

FIG. 7 illustrates a method 200 implemented by a network controller 55 for a steering network 50 of steering traffic associated with a subscriber device 25 located in a private network 15. The network controller 55 receives a reserved set of external ports for a first subscriber device 25 when the subscriber device 25 connects to the external network 30 (block 205). In one embodiment, the reserved set of external ports is received when the subscriber device 25 connects to the external network 30. The network controller 55 further receives a device-specific service path configured for the subscriber device 25 (block 210). The reserved set of external ports and the device-specific service path may be received in a single message (e.g., Device Connect message) or in separate messages. Upon receipt of the reserved set of external ports and the device-specific service path, the network controller 55 configures a steering network 50 to steer traffic associated with the subscriber device 25 according to the device-specific service path.

Figure 8:
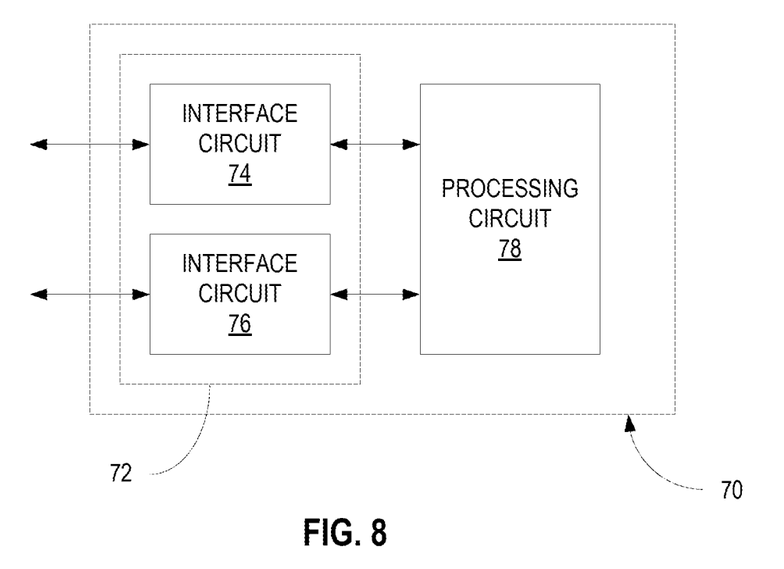
FIG. 8 illustrates a network node configured as a NAT device for enabling device-specific traffic flow steering for subscriber devices hidden behind the NAT device.

FIG. 8 illustrates an exemplary network node 70 configured as a residential gateway 20. The network node includes a communication interface 72 and processing circuit 78. The communication interface 72 comprises a first interface circuit 74 for connecting to a private network, and a second interface circuit 76 for connecting to an external network 30. The interface circuits 74, 76 may comprise Ethernet interface circuits. The processing circuit 78 is connected between the first and second interfaces 74, 76. The processing circuit 78 comprises one or more microprocessors, hardware, firmware, or a combination thereof, and associated memory for storing program instructions and data (e.g. NAT table) required for operation. Memory may comprise both volatile and non-volatile memory devices such as read only memory (ROM) and random and is configured to perform network address translation. The processing circuit 78 is configured to perform the function of the RG 20 as herein described, which includes network address translation.

Figure 9:
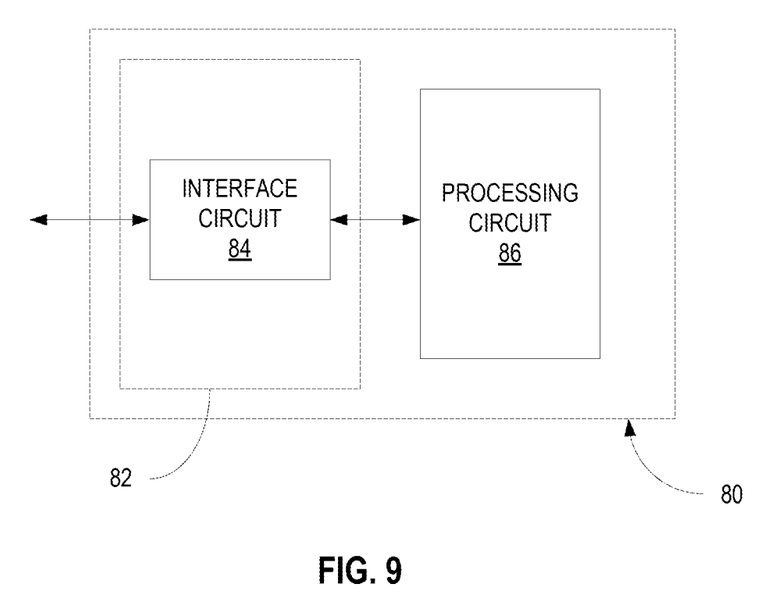
FIG. 9 illustrates a network node configured as an IP edge node or network controller for enabling device-specific traffic flow steering for subscriber devices hidden behind a NAT device.

FIG. 9 illustrates a network node 80 configured to function as an IP edge node 35 or network controller 55. The network node 80 comprises a communication interface 82 and processing circuit 86. The communication interface 82 comprises an interface circuit 84 for connecting the network node to an external network 30. The communication interface 82 may, for example, comprise an ethernet interface circuit. The processing circuit 86 connects to the communication interface 82. The processing circuit 86 comprises one or more microprocessors, hardware, firmware, or a combination thereof, and associated memory for storing program instructions and data required for operation. Memory may comprise both volatile and non-volatile memory devices such as read only memory (ROM) and random access memory (RAM). The processing circuit 86 may be configured to perform the functions of the IP edge node as herein described. Alternatively, the processing circuit 86 may be configured to perform the functions of the network controller 55 as herein described.

Notably, modifications and other embodiments of the disclosure will come to mind to one skilled in the art having the benefit of the teachings presented in the foregoing descriptions and the associated drawings. Therefore, it is to be understood that the disclosure is not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method implemented by a network address translation device in a private communication network of enabling device-specific traffic flow steering, in an external network, of traffic associated with one of a plurality of subscriber devices in the private communication network, the method comprising:

reserving, for a first subscriber device associated with a first device identity, a set of external ports associated with a public IP address of the network address translation device;

receiving, from the external network, a list of device identities for one or more subscriber devices among the plurality of subscriber devices, each subscriber device in said list of devices having a defined device-specific service path;

determining if the first device identity associated with the first subscriber device is included in the received list of device identities; and if the first device identity associated with the first subscriber device is included in the list of device identities, sending the reserved set of external ports and for the first subscriber device and associated IP address to the external network to enable traffic traversing the reserved set of ports to be steered according to a device-specific service path defined for the first subscriber device.

2. The method of claim 1 wherein reserving, for a first subscriber device associated with a first device identity, a set of external ports associated with a public IP address of the network address translation device comprises reserving the set of external ports for the first subscriber device responsive to attachment by the first subscriber device to the network address translation device.

3. The method of claim 1 wherein receiving, from a network node in an external network, a list of devices identities for one or more subscriber devices comprises receiving the list of devices responsive to attachment by the network address translation device to the external network.

4. The method of claim 1 wherein sending the reserved set of external ports for the first subscriber device to the external network comprises sending a device connect message to the external network, said device connect message including the reserved set of ports and device identity of the first subscriber device.

5. The method of claim 1 wherein the network address translation device comprises a residential gateway device.

6. A method implemented by a network node in an external communication network of enabling device-specific traffic flow steering, in the external network, of traffic associated with one of a plurality of subscriber devices, in a private network, the method comprising:

sending, to a network address translation device in the private network, an expression of interest message including a list of devices identities for one or more subscriber devices among the plurality of the subscriber devices in which an interest is expressed and for which a device-specific service path has been defined; and receiving, from the network address translation device, a set of reserved ports associated with a public IP address of the network address translation device for each subscriber device identified in said expression of interest message, wherein traffic traversing each set of reserved ports is steered according to the corresponding device-specific service path.

7. The method of claim 6 wherein receiving, from the network address translation device, a set of reserved ports associated with a public IP address of the network address translation device for at least a one subscriber device identified in said expression of interest message comprises receiving a device connect message from the network address translation device, said device connect message including a device identity for a connecting subscriber device and the set of reserved ports for the connecting subscriber device.

8. The method of claim 6 further comprising sending, responsive to attachment of the network address translation device, a subscriber connect message to a network controller, said subscriber connect message including a subscriber identity and a list of subscriber devices associated with the subscriber identity and corresponding service paths for the subscriber devices.

9. The method of claim 6 further comprising sending a device connect message to a network controller when a subscriber device connects to the external network, said device connect message comprising a device identity for the connecting subscriber device and set of reserved ports for the subscriber device and associated IP address.

10. The method of claim 9 further comprising configuring, responsive to the device connect message, a steering network to steer traffic traversing the set of reserved ports according to a corresponding device-specific service path for the subscriber device.

11. The method of claim 10 wherein the network node comprises an Internet Protocol (IP) edge node.

12. The method of claim 6, further comprising identifying subscriber devices of the subscriber for which a device-specific service path has been defined.

13. The method of claim 12 wherein identifying subscriber devices of a subscriber for which a device-specific service path has been defined comprises:

receiving an attach message from the network address translation device;

authenticating, responsive to the attach message, the network address translation device by performing an authentication procedure with an authentication function in the external network;

obtaining, during the authentication procedure, a list of subscriber devices with associated device identities and service paths from the authentication function.

14. A method implemented by a network controller in a steering network of steering traffic associated with one of a plurality of subscriber devices in a private network, said method comprising:

receiving a reserved set of ports for a first subscriber device, the reserved set of ports being associated with a public address of the subscriber;

receiving a device-specific service path for the first subscriber device; and configuring a steering network to steer traffic received on the reserved set of ports and associated with the first subscriber device according to the device-specific service path.

15. The method of claim 14 wherein receiving a reserved set of ports for a first subscriber device comprises receiving the reserved set of ports for the first subscriber device from a network node in an external network in a device connect message when the first subscriber device connects to the external network.

16. The method of claim 14 wherein receiving a device-specific service path for a first subscriber device comprises receiving the device-specific service path for a first subscriber device when a network address translation device for the subscriber connects to the external network.

17. A network address translation device in a private communication network for enabling device-specific traffic flow steering, in an external network, of traffic associated with one of a plurality of subscriber devices in the private communication network, said network address translation device comprising:

a first interface circuit for communicating with subscriber devices in the private network;

a second interface circuit for communicating with an external network; and a processing circuit connected to the first and second communication interfaces, the processing circuit being configured to:

reserve, for the first subscriber device associated with a first device identity, a set of external ports associated with a public IP address of the network address translation device;

receive, from the external network, a list of devices identities for one or more subscriber devices among the plurality of the subscriber devices, each subscriber device in said list of devices having a defined device-specific service path;

determine if the first device identity associated with the first subscriber device is included in the received list of device identities; and if the first device identity associated with the first subscriber device is included in the list of device identities, send the reserved set of external ports for the first subscriber device and associated IP address to the external network to enable traffic traversing the reserved set of ports to be steered according to a device-specific service path defined for the first subscriber device.

18. The network address translation device of claim 17 wherein the processing circuit is further configured to reserve the set of external ports for the first subscriber device responsive to attachment by the first subscriber device to the network address translation device.

19. The network address translation device of claim 17 wherein the processing circuit is further configured to receive the list of subscriber devices responsive to attachment by the network address translation device to the external network.

20. The network address translation device of claim 17 wherein the processing circuit is further configured to send the reserved set of external ports for the first subscriber device to the external network in a device connect message, the device connect message including the reserved set of external ports and device identity of the first subscriber device.

21. The network address translation device of claim 17 wherein the network address translation device comprises a residential gateway device.

22. A network node in an external network of enabling device-specific traffic flow steering, in the external network, of traffic associated with one of a plurality of subscriber devices in a private network, the network node comprising:

an interface circuit for connecting to an external network and communicating with devices in the external network; and a processing circuit connected to the interface circuit, the processing circuit being configured to:

send, to a network address translation device in the private network, an expression of interest message including a list of devices identities for one or more subscriber devices among the plurality of the subscriber devices in which an interest is expressed and for which a device-specific service path has been defined; and receive, from the network address translation device, a set of reserved ports associated with a public IP address of the network address translation device for each subscriber device identified in said expression of interest message, wherein traffic traversing each set of reserved ports is steered according to the corresponding device-specific service path as defined.

23. The network node of claim 22 wherein the processing circuit is further configured to receive the set of reserved external ports in a device connect message when a subscriber connects to an external network, the device connect message including a device identity for a connecting subscriber device and the set of reserved external ports for the connecting subscriber device and associated IP address.

24. The network node of claim 22 wherein the processing circuit is further configured to send, responsive to attachment of the network address translation device, a subscriber connect message to a network controller, the subscriber connect message including a subscriber identity and a list of subscriber devices associated with the subscriber identity and corresponding service paths for the subscriber devices.

25. The network node of claim 22 wherein the processing circuit is further configured to send a device connect message to a network controller when a subscriber device connects to the external network, the device connect message comprising a device identity for the connecting subscriber device and set of reserved ports for the subscriber device.

26. The network node of claim 22 wherein the network node comprises an Internet Protocol (IP) edge node.

27. The network node of claim 22, wherein the processing circuit is further configured to identify subscriber devices of the subscriber for which a device-specific service path has been defined.

28. The network node of claim 27, wherein the processing circuit is further configured to identify subscriber devices of a subscriber for which a device-specific service path has been defined by:

receiving an attach message from the network address translation device;

authenticating, responsive to the attach message, the network address translation device by performing an authentication procedure with an authentication function in the external network;

obtaining, during the authentication procedure, a list of subscriber devices with associated device identities and service paths from the authentication function.

29. A network controller in a steering network of steering traffic associated with one of a plurality of subscriber devices in a private network, said network controller comprising:

an interface circuit for connecting to an external network and communicating with network nodes in the external network; and a processing circuit connected to the interface circuit, the processing circuit being configured to:

receive a reserved set of ports for a first subscriber device, the reserved set of ports being associated with a public address of the subscriber;

receive a device-specific service path for the first subscriber device; and configure the device-specific service path in a steering network to steer traffic received on the reserved set of ports and associated with the first subscriber device according to the device-specific service path.

30. The network controller of claim 29 wherein the processing circuit is further configured to receive the reserved set of external ports in a device connect message when the first subscriber device connects to the external network.

31. The network controller of claim 29 wherein the processing circuit is further configured to receive the device-specific service path for a first subscriber device when a network address translation device for the subscriber connects to the external network.

* * * * *